US012065966B2

(12) United States Patent
Davis (10) Patent No.: US 12,065,966 B2
(45) Date of Patent: Aug. 20, 2024

(54) DUCT STRUCTURE FOR AIRCRAFT PROPULSION SYSTEM

(71) Applicant: Rohr, Inc., Chula Vista, CA (US)

(72) Inventor: Jennifer Davis, Carlsbad, CA (US)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 18/076,042

(22) Filed: Dec. 6, 2022

(65) Prior Publication Data

US 2024/0183311 A1 Jun. 6, 2024

(51) Int. Cl.
*F02C 7/04* (2006.01)
*F02C 9/18* (2006.01)

(52) U.S. Cl.
CPC ............... *F02C 7/04* (2013.01); *F02C 9/18* (2013.01); *F05D 2220/323* (2013.01); *F05D 2260/606* (2013.01)

(58) Field of Classification Search
CPC ... B64D 33/04; F02C 7/04; F02C 9/18; F05D 2220/323
See application file for complete search history.

(56) References Cited

U.S. PATENT DOCUMENTS

| | | | |
|---|---|---|---|
| 8,263,200 B2 | 9/2012 | Barber | |
| 8,951,375 B2 | 2/2015 | Havens | |
| 9,073,240 B2 | 7/2015 | Huelskamp | |
| 9,279,531 B2 | 3/2016 | Parkin | |
| 9,469,390 B2 | 10/2016 | Kowal | |
| 11,091,847 B2 | 8/2021 | Yang | |
| 2016/0123228 A1* | 5/2016 | Couilleaux | B64D 33/02 415/144 |
| 2016/0237898 A1* | 8/2016 | Poisson | F01D 25/243 |
| 2017/0198719 A1 | 7/2017 | Cerny | |
| 2017/0241342 A1 | 8/2017 | Gekht | |
| 2018/0370110 A1* | 12/2018 | Song | B29C 48/2886 |
| 2020/0130857 A1* | 4/2020 | Mccage | B64D 33/02 |
| 2021/0394917 A1* | 12/2021 | Klovdahl | F02C 7/04 |
| 2022/0154641 A1 | 5/2022 | Judd | |

OTHER PUBLICATIONS

Calculating head loss in a pipeline. Cahaba media Group, Apr. 2015.*
EP Search Report for EP Patent Application No. 23214230.7 dated Apr. 5, 2024.

* cited by examiner

*Primary Examiner* — Todd E Manahan
*Assistant Examiner* — Rodolphe Andre Chabreyrie
(74) *Attorney, Agent, or Firm* — Getz Balich LLC (57) ABSTRACT

An apparatus is provided for an aircraft propulsion system. This apparatus includes a duct structure, and the duct structure includes a transition duct, an inlet duct and a bypass duct. The duct structure is configured as a monolithic body. The transition duct includes an inlet, a first outlet and a second outlet. The transition duct extends longitudinally along a longitudinal centerline from the inlet to the second outlet. The first outlet is arranged longitudinally along the longitudinal centerline between the inlet and the second outlet. A centerline axis of the first outlet is angularly offset from the longitudinal centerline. The inlet duct extends longitudinally along the longitudinal centerline to the inlet. The bypass duct extends longitudinally along the longitudinal centerline from the second outlet.

19 Claims, 9 Drawing Sheets

DUCT STRUCTURE FOR AIRCRAFT PROPULSION SYSTEM

BACKGROUND

1. Technical Field

This disclosure relates generally to an aircraft propulsion system and, more particularly, to a duct structure for the aircraft propulsion system.

2. Background Information

An aircraft propulsion system may include a duct structure for delivering air to an engine such as a turboprop gas turbine engine. The duct structure may also include a bypass duct. Known duct structures may include multiple sections to facilitate installation with the aircraft propulsion system as well as removal for maintenance. While these known duct structures have various benefits, there is still room in the art for improvement.

SUMMARY OF THE DISCLOSURE

According to an aspect of the present disclosure, an apparatus is provided for an aircraft propulsion system. This apparatus includes a duct structure, and the duct structure includes a transition duct, an inlet duct and a bypass duct. The duct structure is configured as a monolithic body. The transition duct includes an inlet, a first outlet and a second outlet. The transition duct extends longitudinally along a longitudinal centerline from the inlet to the second outlet. The first outlet is arranged longitudinally along the longitudinal centerline between the inlet and the second outlet. A centerline axis of the first outlet is angularly offset from the longitudinal centerline. The inlet duct extends longitudinally along the longitudinal centerline to the inlet. The bypass duct extends longitudinally along the longitudinal centerline from the second outlet.

According to another aspect of the present disclosure, another apparatus is provided for an aircraft propulsion system. This apparatus includes a duct structure and a downstream bypass duct. The duct structure includes a transition duct, an inlet duct and an upstream bypass duct. The transition duct includes an inlet, a first outlet and a second outlet. The transition duct extends longitudinally along a longitudinal centerline from the inlet to the second outlet. The first outlet is arranged longitudinally along the longitudinal centerline between the inlet and the second outlet. A centerline axis of the first outlet is angularly offset from the longitudinal centerline. The inlet duct extends longitudinally along the longitudinal centerline to the inlet. The upstream bypass duct extends longitudinally along the longitudinal centerline from the second outlet. The downstream bypass duct is downstream of the upstream bypass duct. The downstream bypass duct is fluidly coupled to the upstream bypass duct at a duct interface. The duct interface has a coupling plane angularly offset from the longitudinal centerline by an acute angle.

According to still another aspect of the present disclosure, another apparatus is provided for an aircraft propulsion system. This apparatus includes a duct structure and a downstream bypass duct. The duct structure includes a transition duct, an inlet duct and an upstream bypass duct. The transition duct includes an inlet, a first outlet and a second outlet. The transition duct extends longitudinally along a longitudinal centerline from the inlet to the second outlet. The first outlet is arranged longitudinally along the longitudinal centerline between the inlet and the second outlet. A centerline axis of the first outlet is angularly offset from the longitudinal centerline. The inlet duct extends longitudinally along the longitudinal centerline to the inlet. The upstream bypass duct extends longitudinally along the longitudinal centerline from the second outlet. The upstream bypass duct has an upstream bypass duct length along the longitudinal centerline. The downstream bypass duct is downstream of the upstream bypass duct along the longitudinal centerline. The downstream bypass duct has a downstream bypass duct length along the longitudinal centerline that is less than the upstream bypass duct length.

The duct structure may be configured as a monolithic body. In addition or alternatively, at least a portion of the longitudinal centerline along the upstream bypass duct may be curved.

The acute angle may be between thirty degrees and eighty degrees.

The apparatus may also include a stationary structure and a cowl pivotally attached to the stationary structure. The downstream bypass duct may be mounted to the cowl. The downstream bypass duct may be configured to move, during pivoting of the cowl, into and out of fluid coupling with the upstream bypass duct.

The duct structure may be formed from a fiber reinforced polymer.

The duct structure may be formed from a metal.

The monolithic body may be configured from or otherwise include a polymer.

The monolithic body may be configured from or otherwise include a metal.

The first outlet may have a first cross-sectional area. The second outlet may have a second cross-sectional area that is less than the first cross-sectional area.

The inlet duct may have an inlet duct length along the longitudinal centerline. The bypass duct may have a bypass duct length along the longitudinal centerline that is greater that at least one-half of the inlet duct length.

The bypass duct may have a lateral width perpendicular to the longitudinal centerline. The bypass duct may have a longitudinal length along the longitudinal centerline that is equal to or greater than the lateral width.

At least a portion of the longitudinal centerline along the bypass duct may be non-straight.

The bypass duct may extend longitudinally along the longitudinal centerline from the second outlet to an end of the bypass duct. The end of the bypass duct may form a face plane angularly offset from the longitudinal centerline by an acute angle.

The apparatus may also include a nose lip forming an airflow inlet into the aircraft propulsion system. The inlet duct may extend longitudinally along the longitudinal centerline from the airflow inlet to the inlet of the transition duct.

The apparatus may also include a downstream bypass duct forming a bypass exhaust from the aircraft propulsion system. The downstream bypass duct may be downstream of and fluidly coupled to the bypass duct.

The downstream bypass duct may be fluidly coupled to the bypass duct at a duct interface. The duct interface may have a coupling plane angularly offset from the longitudinal centerline by an acute angle.

The apparatus may also include a stationary structure and a cowl pivotally attached to the stationary structure. The duct structure may be mounted to the stationary structure. The downstream bypass duct may be mounted to the cowl.

The apparatus may also include an engine. The first outlet may be fluidly coupled with and upstream of an airflow inlet to the engine.

The engine may be configured as or otherwise include a gas turbine engine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
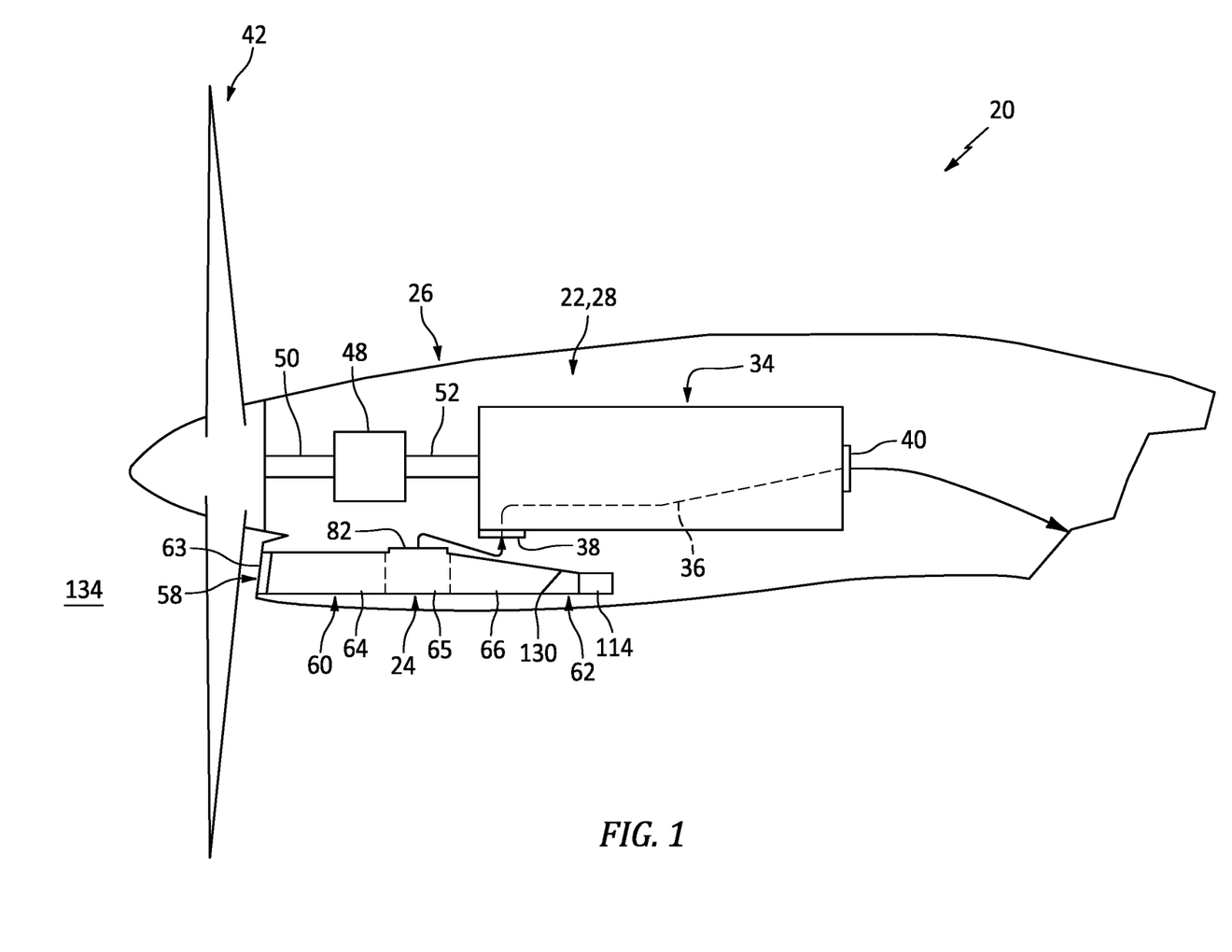
FIG. 1 is a side schematic illustration of an aircraft propulsion system.

FIG. 1 illustrates a propulsion system 20 for an aircraft such as an airplane or another manned or unmanned aerial vehicle. The aircraft propulsion system 20 includes an engine 22 and a duct assembly 24. The aircraft propulsion system 20 also includes a nacelle 26 configured to at least partially (or completely) house and provide an aerodynamic cover for the engine 22 and/or the duct assembly 24.

Figure 2:
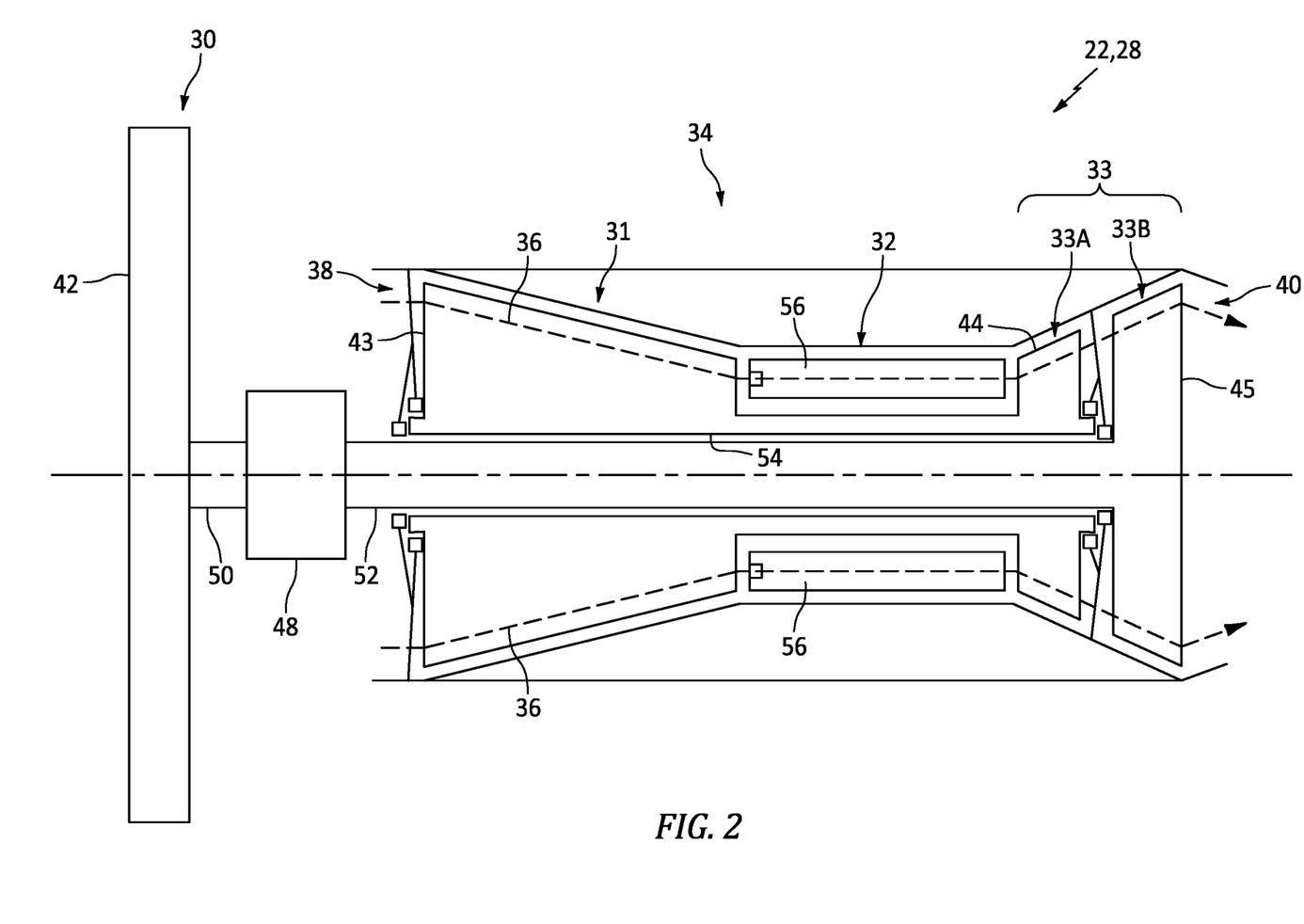
FIG. 2 is a side schematic illustration of an engine for the aircraft propulsion system.

Referring to FIG. 2, the engine 22 may be configured as an open rotor gas turbine engine such as a turboprop gas turbine engine 28. The engine 22 of FIG. 2, for example, includes a propeller section 30, a compressor section 31, a combustor section 32 and a turbine section 33. The turbine section 33 may include a high pressure turbine (HPT) section 33A and a low pressure turbine (LPT) section 33B; e.g., a power turbine section. A core 34 of the engine 22 includes the compressor section 31, the combustor section 32, the HPT section 33A and the LPT section 33B.

The engine sections 31-33B are arranged sequentially along a core flowpath 36 within the engine core 34. This core flowpath 36 extends within the engine core 34 from an upstream airflow inlet 38 into the engine core 34 to a downstream combustion products exhaust 40 from the engine core 34. Here, the airflow inlet 38 is also an airflow inlet into the engine 22 and the exhaust 40 is also a combustion products exhaust from the engine 22; however, the present disclosure is not limited to such an exemplary arrangement.

Each of the engine sections 30, 31, 33A and 33B includes a respective bladed rotor 42-45. Each of these bladed rotors 42-45 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s). The propeller rotor 42 is connected to a geartrain 48 through a propulsor shaft 50. The geartrain 48 is connected to and driven by the LPT rotor 45 through a low speed shaft 52. The compressor rotor 43 is connected to and driven by the HPT rotor 44 through a high speed shaft 54.

During engine operation, air enters the engine core 34 through the airflow inlet 38 and is directed into the core flowpath 36. The air within the core flowpath 36 may be referred to as "core air". This core air is compressed by the compressor rotor 43 and directed into a combustion chamber 56 of a combustor in the combustor section 32. Fuel is injected into the combustion chamber 56 through one or more fuel injectors and mixed with the compressor core air to provide a fuel-air mixture. This fuel-air mixture is ignited and combustion products thereof flow through and sequentially cause the HPT rotor 44 and the LPT rotor 45 to rotate. The rotation of the HPT rotor 44 drives rotation of the compressor rotor 43 and, thus, compression of the air received from the airflow inlet 38. The rotation of the LPT rotor 45 drives rotation of the propeller rotor 42. The rotation of the propeller rotor 42 generates forward aircraft thrust by propelling additional air (e.g., outside of the engine core 34 and the nacelle 26 of FIG. 1) in an aft direction.

The engine 22 is described above as the turboprop gas turbine engine 28 for ease of description. The present disclosure, however, is not limited to such an exemplary engine. The engine 22, for example, may alternatively be configured as another type of open rotor gas turbine engine, or alternatively a ducted gas turbine engine such as a turbofan or turbojet gas turbine engine. Furthermore, it is also contemplated the engine core 34 may be replaced with another engine powerplant such as, but not limited to, a reciprocating piston engine, a rotary engine or another type of internal combustion engine.

Referring to FIG. 1, the duct assembly 24 includes an inlet nose lip 58 of the nacelle 26, a duct structure 60 and a downstream bypass duct 62. The nose lip 58 is configured to form an airflow inlet 63 into the aircraft propulsion system 20 and its duct assembly 24. The nose lip 58 of FIG. 1 is arranged at (e.g., on, adjacent or proximate) a forward end of the nacelle 26. This nose lip 58 may be vertically below (e.g., relative to gravity) and aft/downstream of the propeller rotor hub. The nose lip 58 of the present disclosure, however, is not limited to such an exemplary relative position to the propeller rotor 42.

Figure 3:
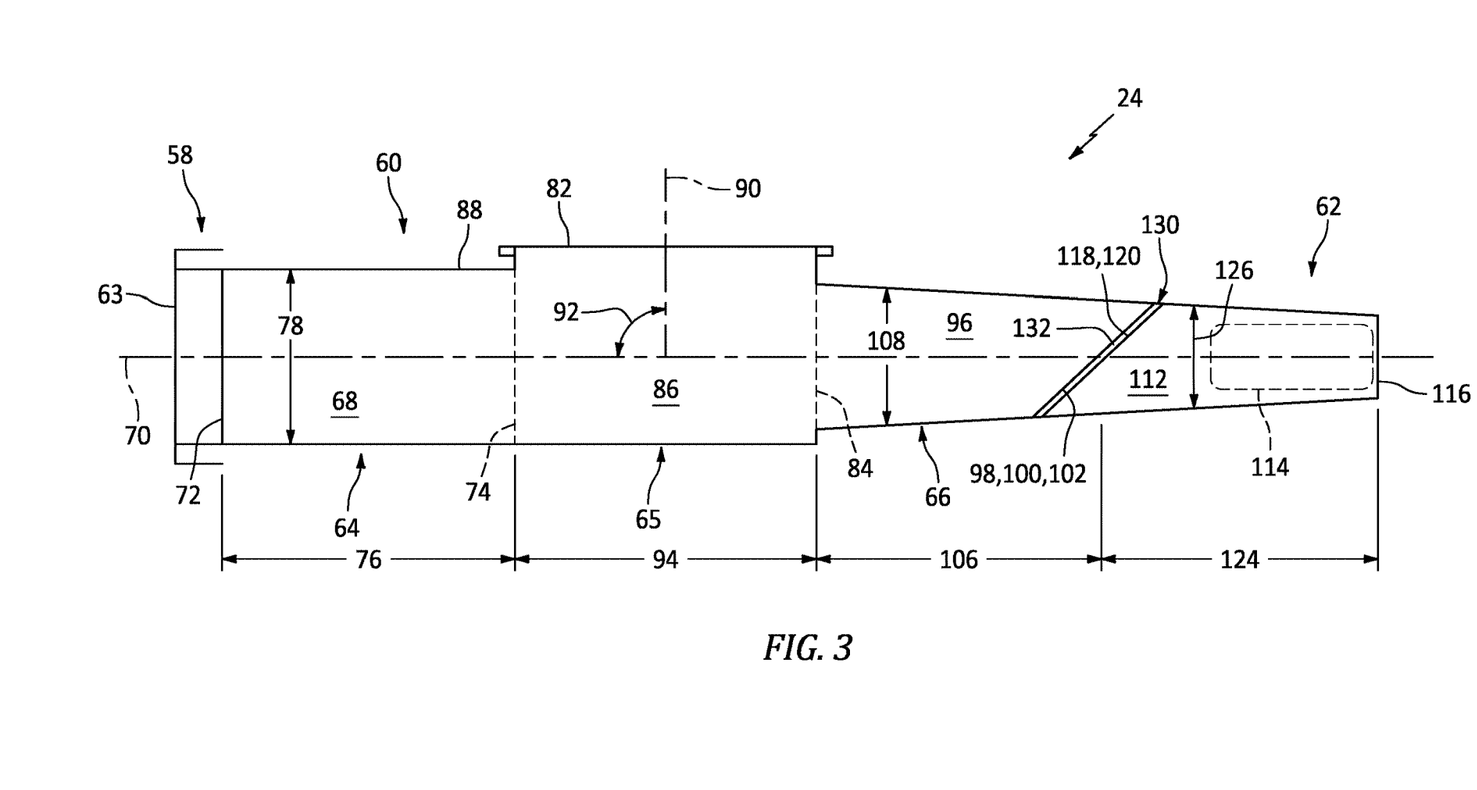
FIG. 3 is a side schematic illustration of a duct assembly for the aircraft propulsion system.
Figure 4:
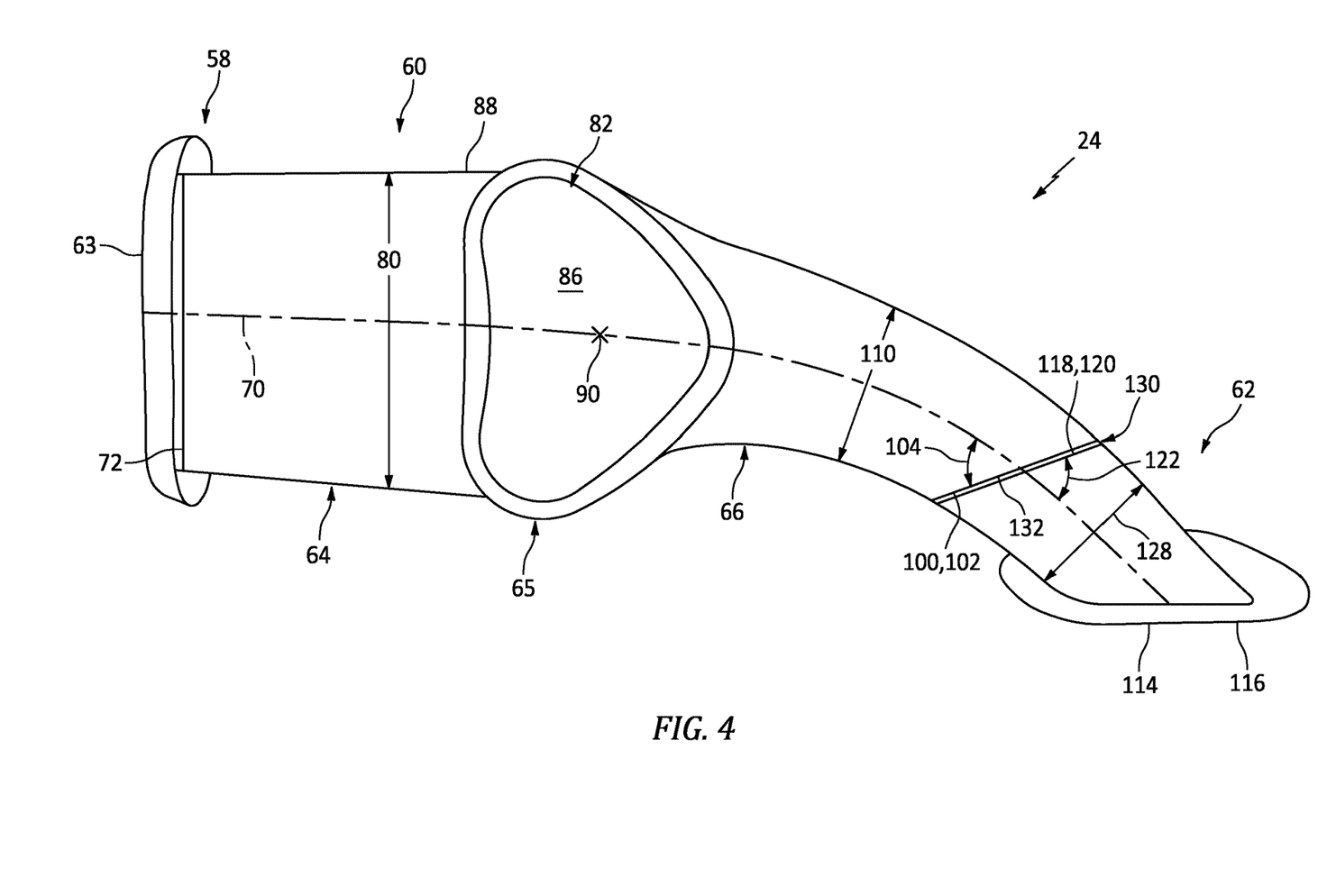
FIG. 4 is a top view schematic illustration of the duct assembly.

Referring to FIGS. 3 and 4, the duct structure 60 includes an inlet duct 64, a transition duct 65 and an upstream bypass duct 66. This duct structure 60 may be configured as a monolithic body. The duct structure members (e.g., the ducts 64-66), for example, may be molded and/or otherwise formed integral together to configure the duct structure 60 as a single, unitary body. Alternatively, sections of the duct structure 60 (e.g., the ducts 64-66 or segments of the ducts 64-66) may be discretely formed and then bonded (e.g., welded, co-cured, etc.) to one another to provide the duct structure 60. By contrast, a non-monolithic body may include a plurality of bodies which are discretely formed and subsequently (e.g., mechanically) fastened to one another. By forming the duct structure 60 as the monolithic body, an overall weight and/or complexity of the duct structure 60 may be reduced.

The duct structure 60 may be constructed from or otherwise include a polymer. This polymer may be structurally reinforced with fiber reinforcement. The fiber reinforcement, for example, may be embedded within a matrix of the polymer. The polymer may be a thermoplastic such as, but not limited to, polyether ether ketone (PEEK), polyether ketone ketone (PEKK), polyphenylene sulfide (PPS) or polyaryletherketone (PAEK). The polymer material may alternatively be a thermoset such as, but not limited to, epoxy or toughened epoxy. The fiber reinforcement may be configured as long strand fibers, continuous fibers, woven fibers, short fibers, etc. The fiber reinforcement may be or otherwise include fiberglass fibers, carbon fibers, aramid (e.g., Kevlar®) fibers, or some combination therewith. The present disclosure, however, is not limited to the foregoing exemplary duct structure materials. In other embodiments, for example, the duct structure 60 may also or alternatively be made from a metal or any other suitable material.

The inlet duct 64 of FIG. 3 has an internal flowpath 68; e.g., a bore. The inlet duct 64 and is flowpath 68 extend longitudinally along a longitudinal centerline 70 (e.g., of the inlet duct 64 and/or its flowpath 68) from a forward, upstream end 72 of the duct structure 60 to an inlet 74 of and into the transition duct 65. At least a portion or an entirety of the longitudinal centerline 70 along the inlet duct 64 may follow a straight trajectory when viewed, for example, in one or more reference planes; e.g., plane of FIG. 3, plane of FIG. 4. The present disclosure, however, is not limited to such an exemplary arrangement. For example, in other embodiments, at least a portion or the entirety of the longitudinal centerline 70 along the inlet duct 64 may follow a non-straight trajectory (e.g., a curved trajectory, a splined trajectory, etc.) in one or more of the references planes.

Figure 5:
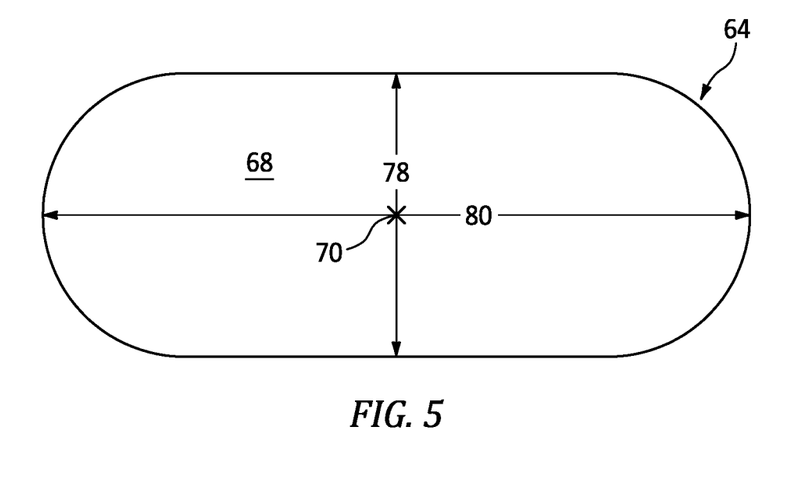
FIG. 5 is a cross-sectional illustration of an inlet duct.

The inlet duct 64 and, more particularly, its flowpath 68 are fluidly coupled with, and downstream of, the airflow inlet 63 formed by the nose lip 58 at the structure upstream end 72. The inlet duct 64 has a longitudinal length 76 along the longitudinal centerline 70. This inlet duct length 76 may be measured from the structure upstream end 72/the nose lip 58 to the transition duct 65 and its inlet 74. The inlet duct 64 has a vertical height 78 perpendicular to the longitudinal centerline 70. This inlet duct height 78 may be measured between (e.g., diametrically) opposing vertical sides of the inlet duct 64. Referring to FIG. 4, the inlet duct 64 has a lateral width 80 perpendicular to the longitudinal centerline 70. This inlet duct width 80 may be measured between (e.g., diametrically) opposing sides of the inlet duct 64. Referring to FIG. 5, the inlet duct width 80 may be sized different (e.g., greater) than the inlet duct height 78 to provide the inlet duct 64 (e.g., at the nose lip 58 of FIG. 4) with an elongated cross-sectional geometry; e.g., oval shaped geometry, stadium (e.g., discorectangle) shaped geometry, etc. The present disclosure, however, is not limited to such an exemplary inlet duct geometry.

Referring to FIGS. 3 and 4, the transition duct 65 may be configured as a manifold and/or a flow splitter for the duct structure 60. The transition duct 65 of FIG. 3, for example, includes the transition duct inlet 74, a first outlet 82 (e.g., an engine outlet), a second outlet 84 (e.g., a bypass outlet) and an internal flowpath 86; e.g., a bore.

The transition duct 65 and its flowpath 86 extend longitudinally along the longitudinal centerline 70 (e.g., of the transition duct 65 and/or its flowpath 86) from the transition duct inlet 74 to the transition duct second outlet 84. At least a portion or an entirety of the longitudinal centerline 70 along the transition duct 65 may follow a straight trajectory when viewed, for example, in one or more reference planes. The present disclosure, however, is not limited to such an exemplary arrangement. For example, in other embodiments, at least a portion or the entirety of the longitudinal centerline 70 along the transition duct 65 may follow a non-straight trajectory (e.g., a curved trajectory, a splined trajectory, etc.) in one or more of the references planes.

The transition duct first outlet 82 is arranged longitudinally along the longitudinal centerline 70 between the transition duct inlet 74 and the transition duct second outlet 84. The transition duct first outlet 82, for example, may be formed by and/or in a sidewall 88 of the duct structure 60. With this arrangement, the transition duct first outlet 82 and the transition duct second outlet 84 are fluidly coupled in parallel with, and downstream of, the transition duct inlet 74 through the transition duct flowpath 86.

The transition duct first outlet 82 extends along a centerline axis 90 of the transition duct first outlet 82 through the structure sidewall 88 to the transition duct flowpath 86. The first outlet centerline axis 90 is angularly offset from the longitudinal centerline 70 by an included angle 92 when viewed, for example, in the first reference plane (e.g., the plane of FIG. 3). The included angle 92 may be a non-zero acute angle or a right angle. The included angle 92, for example, may be between thirty-five degrees and ninety degrees.

The transition duct 65 of FIG. 3 has a longitudinal length 94 along the longitudinal centerline 70. This transition duct length 94 may be measured from the transition duct inlet 74 to the transition duct second outlet 84. This transition duct length 94 may be sized different (e.g., less) than (or equal to) the inlet duct length 76.

Figure 6A:
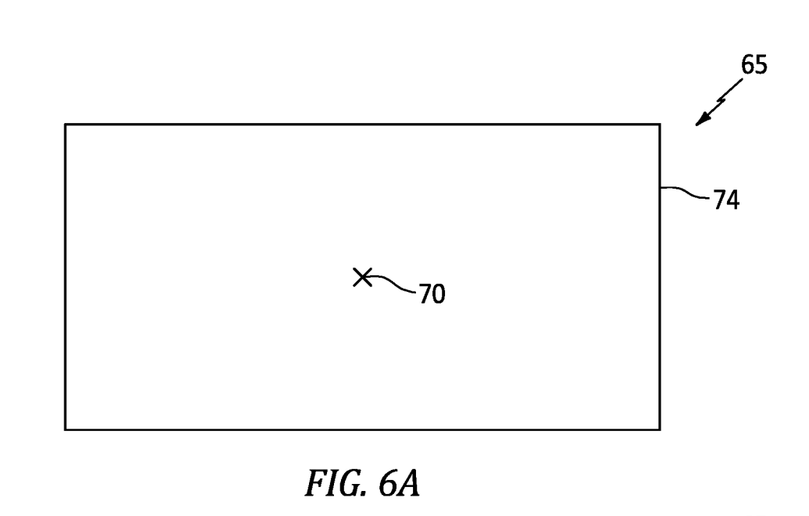
FIGS. 6A-C are schematic cross-sectional illustrations of various orifices of a transition duct.
Figure 6B:
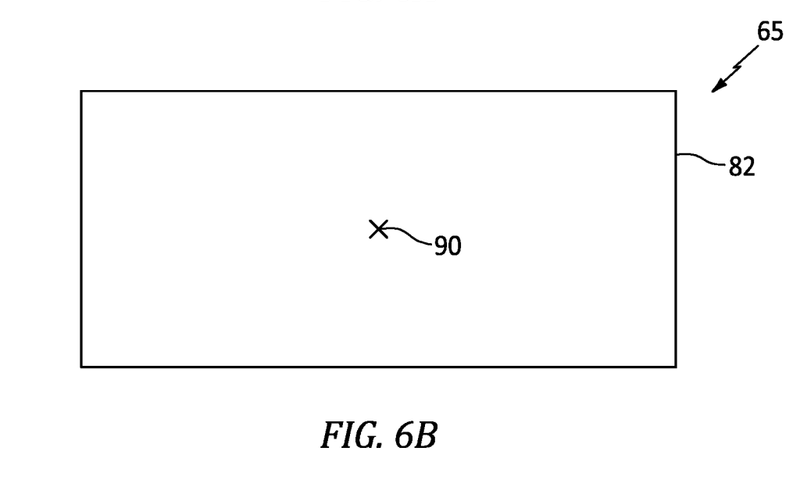
Figure 6C:
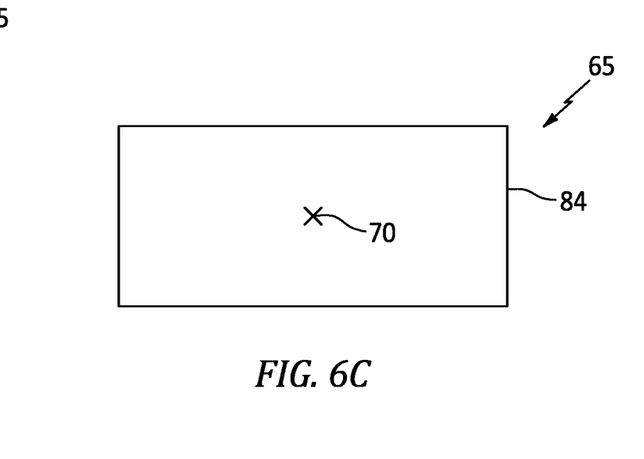

Referring to FIGS. 6A-C, each of the transition duct orifices 74, 82 and 84 has a cross-sectional area (schematically shown). The inlet cross-sectional area is sized greater than the first outlet cross-sectional area and the second outlet cross-sectional area. The inlet cross-sectional area, for example, may be exactly equal to or approximately equal to (e.g., within +/−2% of) a sum of the first outlet cross-sectional area and the second outlet cross-sectional area. The first outlet cross-sectional area, however, may be sized greater than the second outlet cross-sectional area. The first outlet cross-sectional area, for example, may be between one and one-half times (1.5×) and five or ten times (5×, 10×) the second outlet cross-sectional area. The transition duct 65 may thereby be configured to direct a majority of fluid received from the inlet duct 64 to the transition duct first outlet 82 over the transition duct second outlet 84. The present disclosure, however, is not limited to the foregoing exemplary dimensional relationships.

The upstream bypass duct 66 of FIG. 3 has an internal flowpath 96; e.g., a bore. The upstream bypass duct 66 and its flowpath 96 extend longitudinally along the longitudinal centerline 70 (e.g., of the upstream bypass duct 66 and/or its flowpath 96) from the transition duct second outlet 84 to an outlet 98 of the upstream bypass duct 66 and its flowpath 96 at a distal end 100 of the upstream bypass duct 66. Referring to FIG. 4, at least a portion or an entirety of the longitudinal centerline 70 along the upstream bypass duct 66 may follow a non-straight (e.g., curved, splined, bent, etc.) trajectory when viewed, for example, in the second reference plane; e.g., the plane of FIG. 4. The present disclosure, however, is not limited to such an exemplary arrangement.

A face plane 102 formed by the upstream bypass duct 66 at its distal end 100 may be angularly offset from the longitudinal centerline 70. The upstream bypass duct face plane 102 of FIG. 4, for example, is angularly offset from the longitudinal centerline 70 by an included angle 104. This included angle 104 may be a non-zero acute angle. The included angle 104, for example, may be between fifteen degrees and thirty degrees, between thirty degrees and sixty degrees (e.g., forty-five degrees), or between sixty degrees and seventy-five or eighty degrees. The present disclosure, however, is not limited to the foregoing exemplary included angles.

Referring to FIG. 3, the upstream bypass duct 66 has a longitudinal length 106 along the longitudinal centerline 70. This upstream bypass duct length 106 may be measured from the transition duct 65 and its second outlet 84 to the upstream bypass duct end 100; e.g., at the centerline 70. The upstream bypass duct length 106 may be sized greater than at least one-half of the inlet duct length 76. The upstream bypass duct length 106, for example, may be between three-quarters and two times the inlet duct length 76. The upstream bypass duct 66 has a vertical height 108 perpendicular to the longitudinal centerline 70. This upstream bypass duct height 108 may be measured between (e.g., diametrically) opposing vertical sides of the upstream bypass duct 66. The upstream bypass duct length 106 may be sized equal to or greater than the upstream bypass duct height 108. The upstream bypass duct length 106, for example, may be between two and ten times the upstream bypass duct height 108. Referring to FIG. 4, the upstream bypass duct 66 has a lateral width 110 perpendicular to the longitudinal centerline 70. This upstream bypass duct width 110 may be measured between (e.g., diametrically) opposing sides of the upstream bypass duct 66. The upstream bypass duct length 106 (see FIG. 3) may be sized equal to or greater than the upstream bypass duct width 110. The upstream bypass duct length 106 (see FIG. 3), for example, may be between two and ten times the upstream bypass duct width 110. The upstream bypass duct width 110 may also be sized smaller than the inlet duct width 80.

Referring to FIG. 3, the downstream bypass duct 62 has an internal flowpath 112; e.g., a bore. The upstream bypass duct 66 and its flowpath 112 extend longitudinally along the longitudinal centerline 70 (e.g., of the downstream bypass duct 62 and/or its flowpath 112) from the upstream bypass duct 66 and its outlet 98/distal end 100 to a bypass exhaust 114 from the aircraft propulsion system 20 (see FIG. 1) and its duct assembly 24 at a downstream end 116 of the downstream bypass duct 62. At least a portion or an entirety of the longitudinal centerline 70 along the downstream bypass duct 62 may follow a straight trajectory when viewed, for example, in one or more of the reference planes; e.g., plane of FIG. 3, plane of FIG. 4. The present disclosure, however, is not limited to such an exemplary arrangement. For example, in other embodiments, at least a portion or the entirety of the longitudinal centerline 70 along the downstream bypass duct 62 may follow a non-straight trajectory (e.g., a curved trajectory, a splined trajectory, etc.) in one or more of the references planes.

A face plane 118 formed by the downstream bypass duct 62 at its upstream end 120 may be angularly offset from the longitudinal centerline 70. The downstream bypass duct face plane 118 of FIG. 4, for example, is angularly offset from the longitudinal centerline 70 by an included angle 122. This included angle 122 may be equal to (or otherwise selected based on) the included angle 104 of the upstream bypass duct face plane 102.

Figure 7:
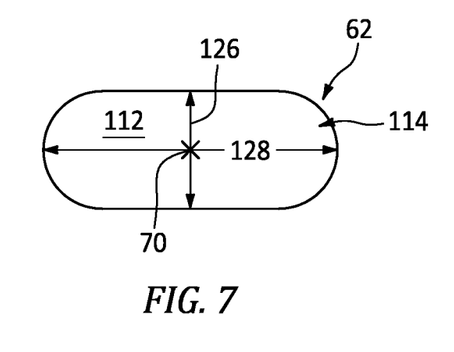
FIG. 7 is a cross-sectional illustration of a downstream bypass duct.

Referring to FIG. 3, the downstream bypass duct 62 has a longitudinal length 124 along the longitudinal centerline 70. This downstream bypass duct length 124 may be measured from the downstream bypass duct upstream end 120 to the downstream bypass duct downstream end 116. The downstream bypass duct length 124 may be sized equal to or less than the upstream bypass duct length 106. The upstream bypass duct length 106, for example, may be between one and five times the downstream bypass duct length 124 (e.g., see FIG. 4). The downstream bypass duct 62 has a vertical height 126 perpendicular to the longitudinal centerline 70. This downstream bypass duct height 126 may be measured between (e.g., diametrically) opposing vertical sides of the downstream bypass duct 62. Referring to FIG. 4, the downstream bypass duct 62 has a lateral width 128 perpendicular to the longitudinal centerline 70. This downstream bypass duct width 128 may be measured between (e.g., diametrically) opposing sides of the downstream bypass duct 62. Referring to FIG. 7, the downstream bypass duct width 128 may be sized different (e.g., greater) than the downstream bypass duct height 126 to provide the downstream bypass duct 62 (e.g., at the bypass exhaust 114) with an elongated cross-sectional geometry; e.g., oval shaped geometry, stadium (e.g., discorectangle) shaped geometry, etc. The present disclosure, however, is not limited to such an exemplary downstream bypass duct geometry.

Referring to FIGS. 3 and 4, the downstream bypass duct 62 is fluidly coupled with the duct structure 60 and its upstream bypass duct 66 at a (e.g., sealed) duct interface 130. The bypass duct ends 100 and 120, for example, may engage one another through at least one seal element 132; e.g., an annular gasket or the like. The bypass duct interface 130 of FIG. 4 has a coupling plane corresponding to the face planes 102 and 118 of the bypass duct ends 100 and 120. More particularly, the coupling plane of FIG. 4 is angularly offset from the longitudinal centerline 70 by an included angle. This included angle may be equal to (or otherwise selected based on) the included angle 104 of the upstream bypass duct face plane 102.

Referring to FIG. 1, with the foregoing configuration, the duct assembly 24 is configured to receive (e.g., ingest) ambient air through the nose lip 58 from an environment 134 external (e.g., outside of, surrounding, etc.) the aircraft propulsion system 20; e.g., an external ambient environment. The duct assembly 24 and its duct structure 60 are configured to direct some of the ambient air to the engine 22 and its airflow inlet 38 through the transition duct first outlet 82 to supply (e.g., all or at least some) of the core air. The duct assembly 24 is also configured to bypass some of the ambient air from the engine 22 and its core flowpath 36 into the bypass ducts 62 and 66. More particularly, the duct assembly 24 may be configured such that any, substantially all or at least some debris (e.g., foreign object debris (FOD)) which enters the duct assembly 24 with the ambient air through the nose lip 58 is carried with the bypass air and exhausted from the aircraft propulsion system 20 through the bypass exhaust 114 without entering the engine 22 and its core flowpath 36. It is contemplated, of course, the bypass air flowing through the bypass ducts 62 and 66 may also or alternatively be used for various other purposes.

Figure 8A:
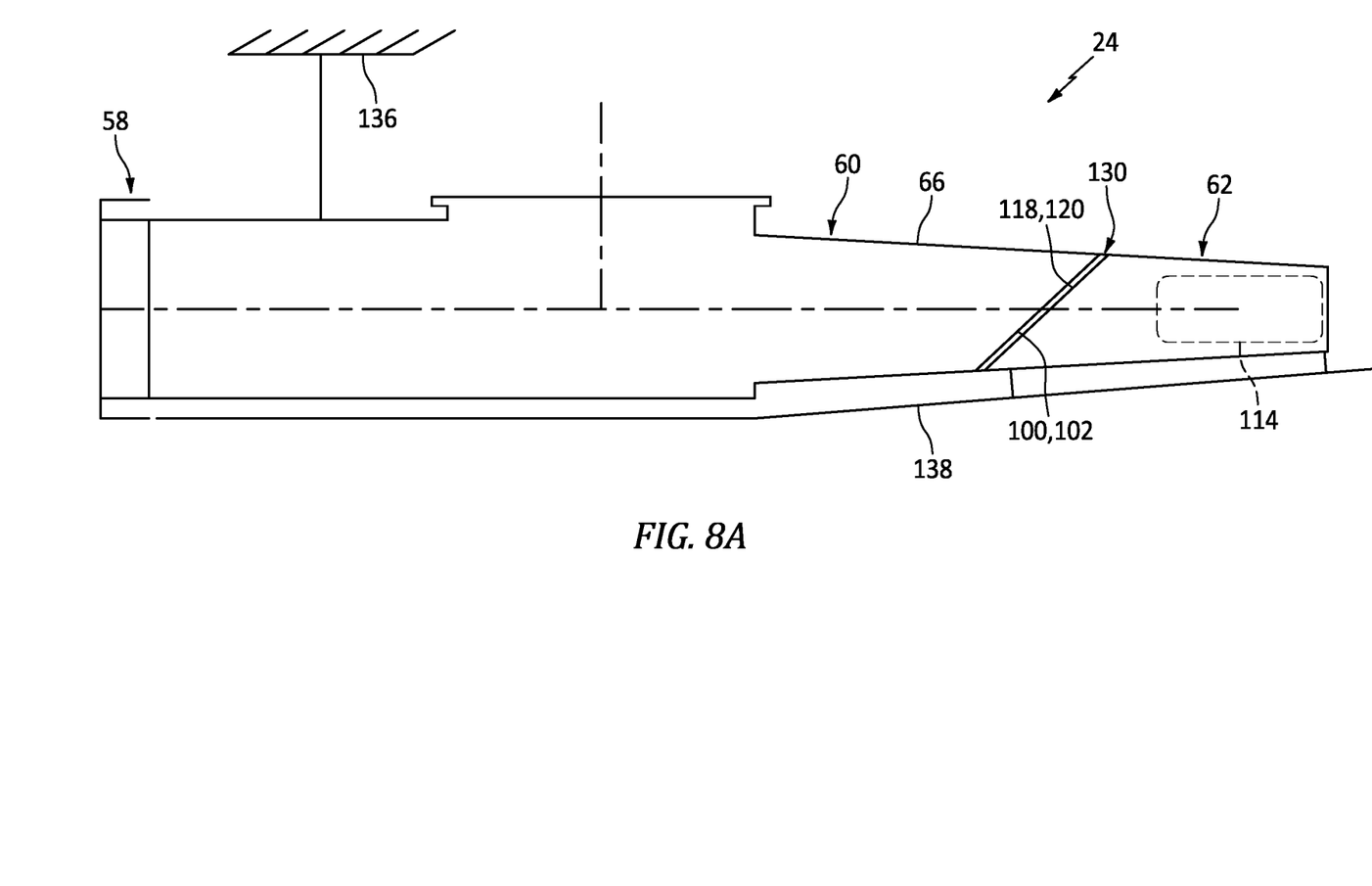
FIGS. 8A and 8B are side schematic illustrations of the duct assembly arranged with a stationary structure and a cowl in closed and open positions.
Figure 8B:
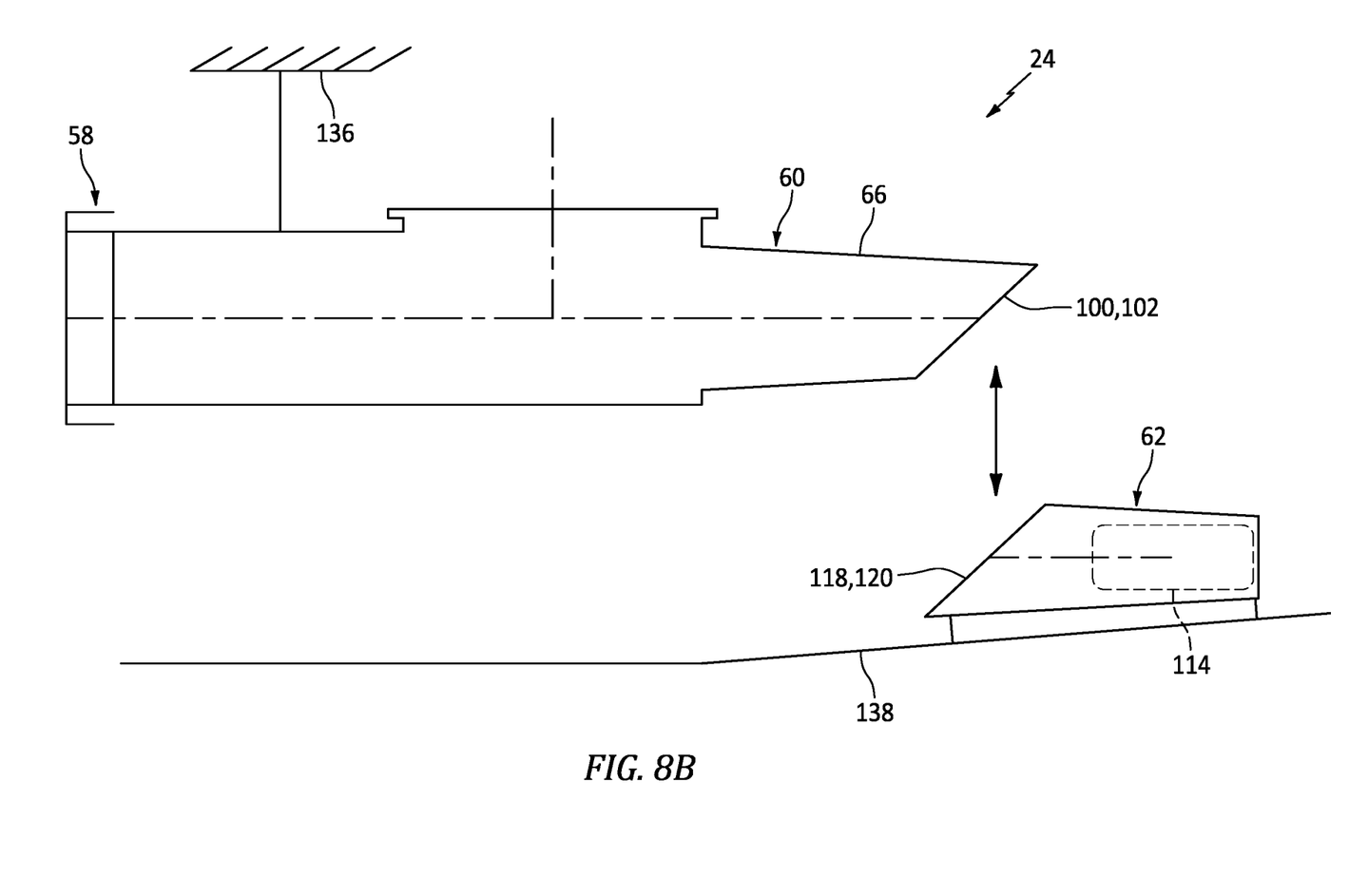
Figure 9A:
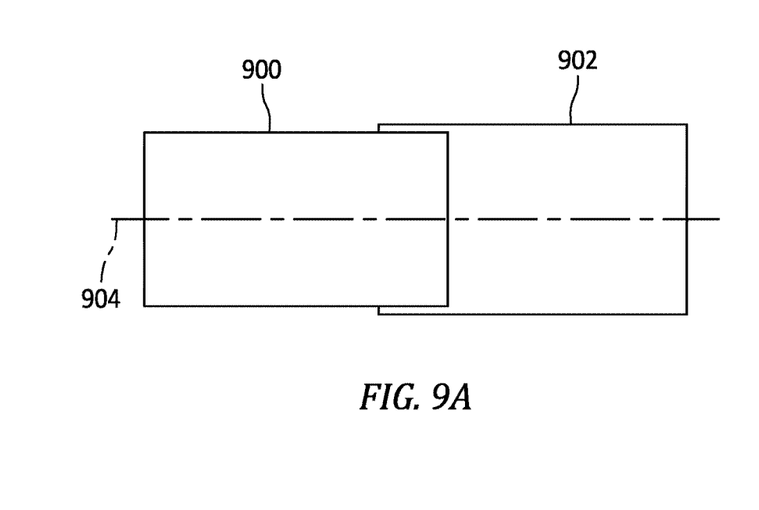
FIGS. 9A and 9B are side schematic illustrations of another duct assembly in coupled and uncoupled arrangements.
Figure 9B:
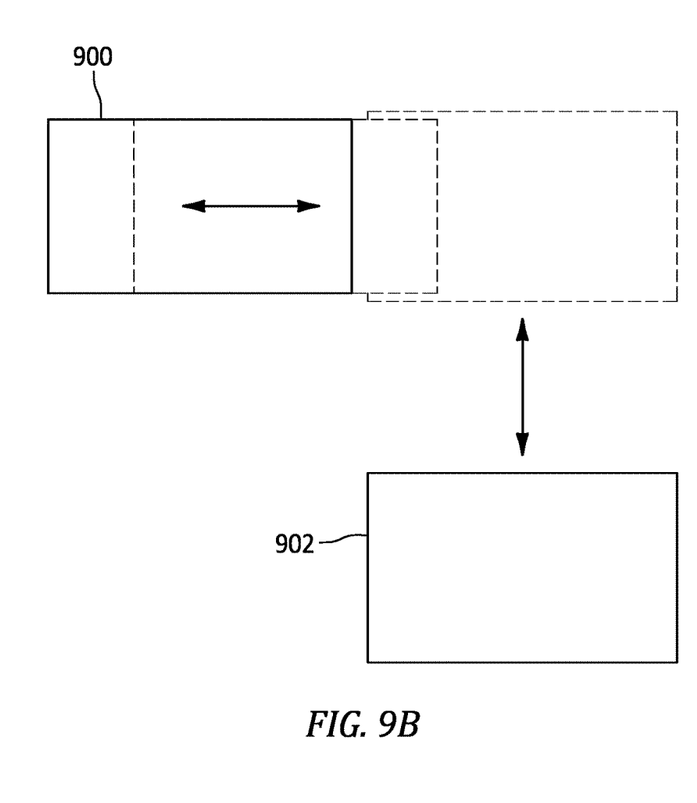

In some embodiments, referring to FIGS. 8A and 8B, the nose lip 58 and the duct structure 60 may be arranged with and/or mounted to a stationary structure 136 of the aircraft propulsion system 20. This stationary structure 136 may be configured as part of the nacelle 26 and/or an internal support structure for the nacelle 26 and/or the engine 22 (see FIG. 1). The downstream bypass duct 62, on the other hand, may be arranged with and/or mounted to a cowl 138 moveably (e.g., pivotally) attached to the stationary structure 136, or another stationary structure of the aircraft propulsion system 20. With this arrangement, the downstream bypass duct 62 may move into and out of fluid coupling with the upstream bypass duct 66 during pivoting of the cowl 138 between its closed and open positions. This movement/fluid coupling is facilitated by the bypass duct interface 130 (see also FIG. 4). For example, by providing the angled coupling plane between the bypass ducts 62 and 66, the downstream bypass duct 62 of FIGS. 8A and 8B may be moved towards or away from the upstream bypass duct 66 to facilitate coupling or uncoupling of the bypass ducts 62 and 66. By contrast, where ducts 900 and 902 are longitudinally nested as shown in FIGS. 9A and B, one of the ducts 900 (or 902) needs to be translated before the duct 902 (or 900) can be moved in a direction perpendicular to a longitudinal centerline 904 of the ducts 900 and 902.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An apparatus for an aircraft propulsion system, comprising:
    a duct structure including a transition duct, an inlet duct and a bypass duct, the duct structure configured as a monolithic body;
    the transition duct including an inlet, a first outlet and a second outlet, the transition duct extending longitudinally along a longitudinal centerline from the inlet to the second outlet, the first outlet arranged longitudinally along the longitudinal centerline between the inlet and the second outlet, and a centerline axis of the first outlet angularly offset from the longitudinal centerline;
    the inlet duct extending longitudinally along the longitudinal centerline to the inlet; and
    the bypass duct extending longitudinally along the longitudinal centerline from the second outlet;
    wherein at least a portion of the longitudinal centerline along the bypass duct is non-straight when viewed in a reference plane perpendicular to the centerline axis of the first outlet.

2. The apparatus of claim 1, wherein
    the monolithic body is constructed from a fiber reinforced polymer; and
    the fiber reinforced polymer comprises fiber reinforcement embedded within a thermoplastic matrix.

3. The apparatus of claim 2, wherein the thermoplastic matrix comprises polyether ether ketone, polyether ketone ketone, polyphenylene sulfide or polyaryletherketone.

4. The apparatus of claim 1, wherein
    the first outlet has a first cross-sectional area; and
    the second outlet has a second cross-sectional area that is less than the first cross-sectional area.

5. The apparatus of claim 1, wherein
    the inlet duct has an inlet duct length along the longitudinal centerline; and
    the bypass duct has a bypass duct length along the longitudinal centerline that is greater than at least one-half of the inlet duct length.

6. The apparatus of claim 1, wherein
    the bypass duct has a lateral width perpendicular to the longitudinal centerline; and
    the bypass duct has a longitudinal length along the longitudinal centerline that is equal to or greater than the lateral width.

7. The apparatus of claim 1, wherein
    the bypass duct extends longitudinally along the longitudinal centerline from the second outlet to an end of the bypass duct; and
    the end of the bypass duct forms a face plane angularly offset from the longitudinal centerline by an acute angle between fifteen degrees and sixty degrees.

8. The apparatus of claim 1, further comprising:
    a nose lip forming an airflow inlet into the aircraft propulsion system; and
    the inlet duct extending longitudinally along the longitudinal centerline from the airflow inlet to the inlet of the transition duct where the nose lip is longitudinally adjacent an upstream end of the monolithic body.

9. The apparatus of claim 1, further comprising:
    an engine;
    the first outlet fluidly coupled with and upstream of an airflow inlet to the engine.

10. The apparatus of claim 9, wherein the engine comprises a gas turbine engine.

11. The apparatus of claim 1, wherein
    the monolithic body is constructed from a fiber reinforced polymer; and
    the fiber reinforced polymer comprises fiber reinforcement embedded within a thermoset matrix.

12. The apparatus of claim 11, wherein the thermoset matrix comprises epoxy.

13. An apparatus for an aircraft propulsion system, comprising:
    a duct structure including a transition duct, an inlet duct and a bypass duct, the duct structure configured as a monolithic body;
    the transition duct including an inlet, a first outlet and a second outlet, the transition duct extending longitudinally along a longitudinal centerline from the inlet to the second outlet, the first outlet arranged longitudinally along the longitudinal centerline between the inlet and the second outlet, and a centerline axis of the first outlet angularly offset from the longitudinal centerline;
    the inlet duct extending longitudinally along the longitudinal centerline to the inlet; and
    the bypass duct extending longitudinally along the longitudinal centerline from the second outlet; and
    a downstream bypass duct forming a bypass exhaust from the aircraft propulsion system;
    the downstream bypass duct downstream of and fluidly coupled to the bypass duct; and
    the bypass exhaust is angularly offset from the inlet when viewed in a reference plane parallel with the first outlet.

14. The apparatus of claim 13, wherein
    the downstream bypass duct is fluidly coupled to the bypass duct at a duct interface; and
    the duct interface has a coupling plane angularly offset from the longitudinal centerline by an acute angle.

15. The apparatus of claim 13, further comprising:
    a stationary structure, the duct structure mounted to the stationary structure; and
    a cowl pivotally attached to the stationary structure, the downstream bypass duct mounted to the cowl.

16. An apparatus for an aircraft propulsion system, comprising:
    a duct structure including a transition duct, an inlet duct and an upstream bypass duct;

the transition duct including an inlet, a first outlet and a second outlet, the transition duct extending longitudinally along a longitudinal centerline from the inlet to the second outlet, the first outlet arranged longitudinally along the longitudinal centerline between the inlet and the second outlet, and a centerline axis of the first outlet angularly offset from the longitudinal centerline;

the inlet duct extending longitudinally along the longitudinal centerline to the inlet; and the upstream bypass duct extending longitudinally along the longitudinal centerline from the second outlet; and a downstream bypass duct downstream of the upstream bypass duct, the downstream bypass duct fluidly coupled to the upstream bypass duct at a duct interface, and the duct interface having a coupling plane angularly offset from the longitudinal centerline by an acute angle between fifteen degrees and sixty degrees;

wherein at least a portion of the longitudinal centerline along the upstream bypass duct is non-straight when viewed in a reference plane perpendicular to the centerline axis of the first outlet.

17. The apparatus of claim 16, wherein the acute angle is forty-five degrees.

18. The apparatus of claim 16, further comprising:
a stationary structure; and
a cowl pivotally attached to the stationary structure;
the downstream bypass duct mounted to the cowl; and
the downstream bypass duct configured to move, during pivoting of the cowl, into and out of fluid coupling with the upstream bypass duct.

19. The apparatus of claim 16, wherein
the duct structure is formed from a fiber reinforced polymer; and
the fiber reinforced polymer comprises polyether ether ketone, polyether ketone ketone, polyphenylene sulfide or polyaryletherketone.

\* \* \* \* \*